(12) United States Patent
Müller et al.

(10) Patent No.: US 6,235,258 B1
(45) Date of Patent: May 22, 2001

(54) HIGH SURFACE AREA SILICA SOLID

(75) Inventors: Ulrich Müller, Neustadt; Ulrich Steuerle, Heidelberg, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/122,849

(22) Filed: Jul. 27, 1998

(30) Foreign Application Priority Data

Jul. 30, 1997 (DE) ................................ 197 32 865

(51) Int. Cl.[7] ......................... C01B 33/12; A01N 25/34; B01J 21/14; B01J 20/10; C07F 9/02
(52) U.S. Cl. ................... 423/335; 424/404; 502/232; 502/407; 556/400
(58) Field of Search ............ 423/335; 556/400; 502/232, 407; 424/404

(56) References Cited

FOREIGN PATENT DOCUMENTS

| | | |
|---|---|---|
| 015132 | 9/1980 | (EP). |
| 775520 | 5/1997 | (EP). |
| 814059 | 12/1997 | (EP). |

OTHER PUBLICATIONS

Le Febre et al., *Zeolites*, vol. 8, No. 1, Jan. 1988, pp. 60–67.
Gunawardane et al., *Zeolites*, vol. 8, No. 2, Mar. 1988, pp. 127–131.
Corma et al., *Zeolites*, vol. 15, No. 1, Jan. 1995, pp. 2–8.
Ullmann's *Enc. of Techn. Chem.* 4th Ed., vol. 21, pp. 439–476.
Kresge et al., *Nature*, vol. 359, pp. 710–712, 1992.
Derwent Abstracts of DE 44 07 326.
Derwent Abstracts of DE 195 43 638.

*Primary Examiner*—John Kight
*Assistant Examiner*—Raymond Covington
(74) *Attorney, Agent, or Firm*—Keil & Weinkauf

(57) ABSTRACT

A non-crystalline silica solid is obtainable by a process comprising the step of contacting in a liquid medium at least one silica precursor with at least one template comprising a polyethyleneimine or a mixture of two or more thereof.

12 Claims, 1 Drawing Sheet

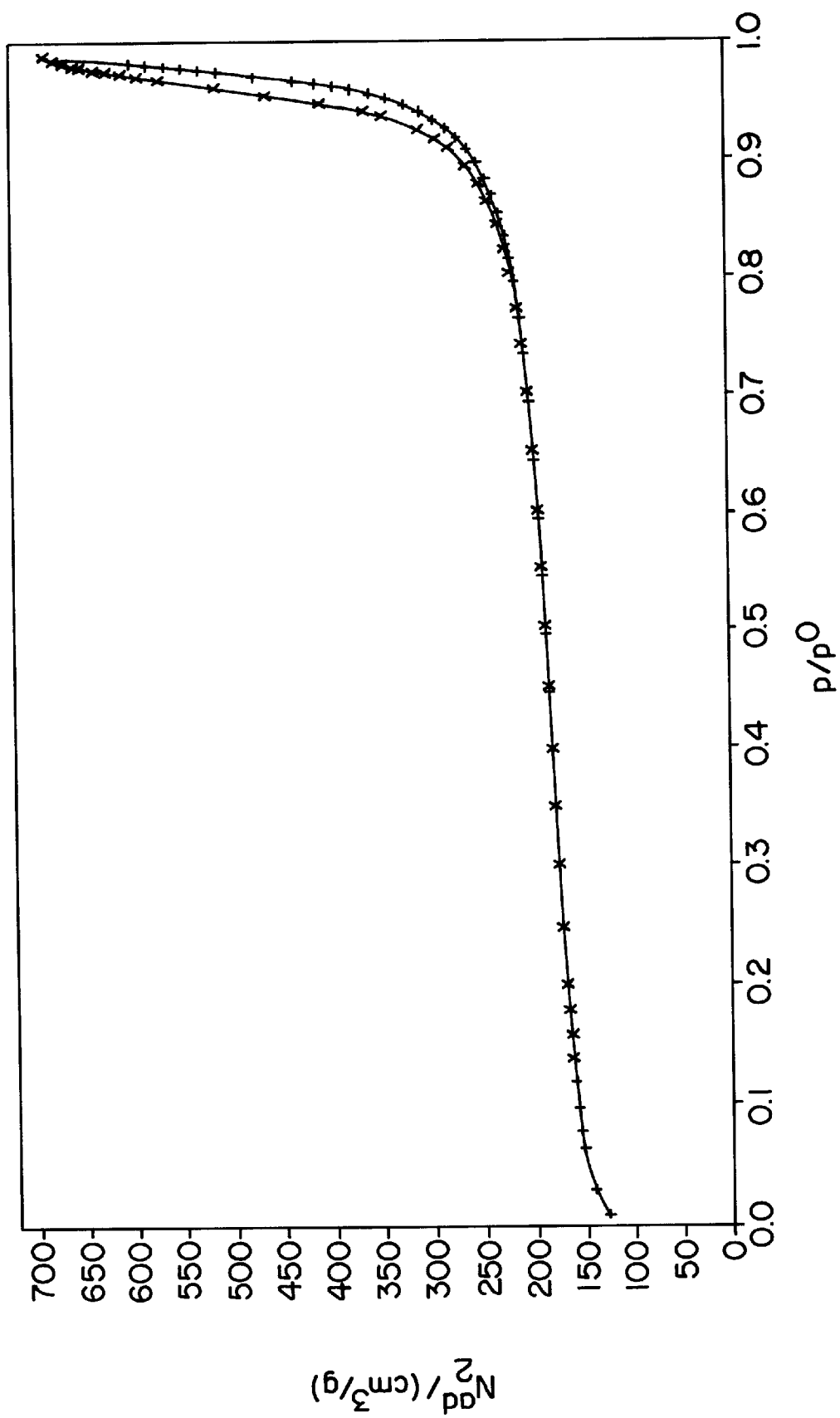

HIGH SURFACE AREA SILICA SOLID

The present invention relates to a high specific surface area silica solid, to process for preparing it and to the use of polyethyleneimines as templates.

The preparation of silica solids, for example silicic acids and silica gels, is known per se. A survey of the processes currently in industrial use is given in Ullmann's Enzykl. Techn. Chem. 4th ed., vol. 21, 1982, pp. 439–476.

Silica thus prepared has a specific surface area in the range from 200 to 800 $m^2/g$ and pore diameters of from 8 to 20 nm, with large-pore silicas generally having smaller surface areas. Such large-pore silicas have a broad pore size distribution extending over a range from 5 to 30 nm.

High surface area MCM-41 type aluminosilicates having a narrow pore size distribution have been described by Kresge et al. in Nature 359 (1992), 710–712, but with pore size limited to a range from 2 to 4 nm. This reference describes the use of, for example, cetyltrimethylammonium ions as pore-formers and states that it is possible to vary the pore size by varying the long-chain alkyl group.

Mesoporous oxides have likewise been described, for example in DE-A 44 07 326 and DE-A 195 43 638. According to these references, mesoporous oxides are prepared by adding a cationic, anionic or nonionic surfactant as a structure-directing reagent, or template, to the oxide precursors (monomers or oligomers) in the course of the polycondensation process to give an inorganic oxide. According to these references, the actual synthesis is followed by thermal removal of the template surfactants, for example by calcining in air at from 350 to 600° C., giving rise to a mesoporous, purely inorganic oxide.

The pore sizes of prior art mesoporous oxides are predominantly confined to the range of about 2 nm to about 6 nm.

However, oxide solids which have smaller pores and which are inexpensive to produce are desirable for some applications, for example for use as adsorbents, to be able to generate strong forces of adsorption and hence to obtain the substrate to be purified in high purity after use of the oxide as adsorbent. This aim is in fact achieved with some of the commercially available silicas, which, however, have broad pore diameter distributions and comparatively small specific surface areas.

It is an object of the present invention to provide a silica solid which is suitable for a multiplicity of applications, in particular for use as adsorbent, and a process for preparing this solid in an economically favorable, ie. inexpensive, way.

We have found that, surprisingly, this object is achieved by using a template comprising a polyethyleneimine in the preparation of the silica solid.

The present invention accordingly provides a process for preparing a silica solid, which comprises the step of contacting in a liquid medium at least one silica precursor with at least one template comprising a polyethyleneimine or a mixture of two or more thereof.

This invention further provides a silica solid obtainable by a process comprising the step of contacting in a liquid medium at least one silica precursor with at least one template comprising a polyethyleneimine or a mixture of two or more thereof.

The Figure shows the result of nitrogen adsorption on the solid of Example 1. Here, $p/p^0$ stands for the relative pressure, $N_2^{ad}$ for the volume of adsorbed nitrogen per g adsorbent, + for a measured value obtained during adsorption, and * for a measured value obtained during desorption.

"Micropores" refer to pores having a diameter of 2 nm or less; "mesopores" refer to pores having a diameter of from 2 to 50 nm; "macropores" refer to pores having a diameter of 50 nm or more.

"Template" refers to a substance which is initially mixed with the starting materials and subsequently removed from the resulting solid, eg. by thermal treatment, to leave the areas of the solid in which the template was located in the form of pores.

As stated above, templates comrising polyethyleneimines are used according to the invention. Polyethyleneimines are polymerization products of ethyleneimine, especially homopolymers. Polyethyleneimines prepared by known processes described, for example, in Rompps Chemie Lexikon, 8th ed. 1992, p. 3532–3533 and in Ullmann's Enzyklopädie der techn. Chem., 4th ed. 1974, vol. 8, p. 212–213 and the references cited therein, the relevant contents of which are fully incorporated herein by reference, have molecular weights in the range from about 450 to 100,000 g/mol. In these processes, polymers of higher molecular weight are obtained by crosslinking with polyfunctional compounds such as diisocyanates.

In one embodiment, a polyethyleneimine or a mixture of two or more thereof is used as a template.

In a further embodiment, polymer dispersions are used which comprise mainly, ie. more than 50% by weight based on the polymer content of the dispersion, polyethyleneimine.

Useful polymers present in such a dispersion in addition to polyethyleneimine are in principle any polymers having hydrophilic properties, for example poly(meth)acrylates, poly(ethylene oxide)s, polyesters, polyamides, poly(vinyl alcohol), polyvinylpyrrolidone, natural polysaccharides, eg. starch and pectins, and also semisynthetic polymers, eg. cellulose ethers.

Particular examples are poly(ethylene oxide), poly(methyl methacrylate), poly(methyl acrylate) and poly(vinyl alcohol).

It is of course also possible to use templates comprising mixtures of two or more polyethyleneimines and further polymers as defined above, if desired.

The amount of polyethyleneimine template used is generally not subject to any particular restrictions and is preferably from about 0.05 to about 50% by weight, more preferably from about 2 to about 10% by weight, in each case based on the synthesis batch, ie. the total amount of silica precursor, template and liquid medium.

Liquid media used in the process of the invention are preferably aqueous solutions, for example mixtures of water and alcohols, eg. ethanol and/or isopropanol. However, contacting may also be carried out in water, an organic solvent or a mixture of different organic solvents.

Preference is given to using alcohol solvents generated by hydrolysis of the silica precursors, ie., for example, ethanol when using tetraethyl orthosilicate ($Si(OEt)_4$), isopropanol when using tetraisopropyl orthosilicate and butanol when using tetrabutyl orthosilicate.

A usable silica precursor is any compound which is converted into silica by calcining in air at elevated temperatures. The precursor may be employed, for example, as an organometallic component, eg. as alkoxide, Grignard compound, alkylate, chelate, eg. with acetylacetonate, in a form which is soluble in an organic solvent, or in the form of soluble salts, as a hydroxide, as a colloid in an aqueous phase or as a combination of two or more thereof.

Contacting can be carried out at a basic, acidic or neutral pH, preference being given to an acidic pH, especially a pH of from 1 to 5.

After combining the silica precursor and the template in a liquid medium, the resulting suspension is brought to the appropriate pH and stirred at preferably from about −10 to about 150° C., more preferably from about 10 to about 90° C., especially from about 20 to about 65° C., for from about 0.5 to about 72 hours, preferably from about 1 to about 48 hours, especially from about 10 to about 30 hours. When contacting the components described above, the pressure is preferably from about 0.4 to about 300 bar more preferably from about 0.8 to about 150 bar and especially from about 1 to about 10 bar.

The resulting suspension is then separated from the liquid medium, for example by centrifugation or simple filtration, and subsequently dried. Drying is preferably effected initially at ambient temperature for from about 5 to about 72 hours, preferably from about 10 to about 48 hours, especially from about 20 to about 30 hours, and then at an elevated temperature in the range of from about 50 to about 100° C., preferably from about 55 to about 70° C., for several hours.

The silica solid dried in this manner is subsequently calcined at from about 350 to about 800° C., preferably from about 400 to about 700° C., especially from about 450 to about 600° C., for from about 2 to about 10 hours, preferably from about 4 to about 6 hours, in the presence of oxygen, preferably in air.

During the contacting of the silica precursor with the template, the following additional components may be added:

- pharmacologically active organic or inorganic compounds such as analgesics or cardiovascular agents, in which case the incorporation of these compounds into the silica solid results in retarded release of the pharmacologically active compound on application;
- enzymes for biotechnological application such as oxidases, reductases, transferases, hydrolases, lyases, isomerases, ligases and semisynthetic and synthetic enzymes as described, for example, in Science, 223 (1984) p. 165ff, Cold Spring Harbor Symp. Quant Biol. 52 (1987), p. 75–81, and Tetrahedron 40 (1994), p. 269–292, the relevant contents of which are fully incorporated herein by reference;
- pigments such as ferromagnetic pigments, eg. chromium (IV) dioxide, ferrites, iron oxides, iron or iron alloys, further inorganic pigments, eg. chalk, graphite, titanium white, white lead or zinc white, carbon black, luminescent pigments, eg. zinc sulfide or alkaline earth metal aluminates, organic pigments such as azo pigments, indigoid pigments, phthalocyanine pigments, metal complex pigments or diketopyrrolopyrrole pigments, which are likewise present in encapsulated form in the resulting silica solid.

In the preparation of the silica solid of the invention, it is also possible to add, in particular via the aqueous phase, an ionic compound of an element of main groups I to III or of transition groups I to VIII of the Periodic is Table of the Elements, the lanthanoids, germanium, tin, lead, phosphorus, antimony, bismuth, sulfur, selenium, tellurium or a mixture of two or more thereof, preferably sodium, potassium, calcium, magnesium, beryllium, boron, aluminum, gallium, indium, germanium, tin, lead, antimony, bismuth, scandium, yttrium, lanthanum, titanium, zirconium, hafnium, vanadium, niobium, tantalum, chromium, molybdenum, tungsten, manganese, rhenium, iron, cobalt, nickel, ruthenium, copper, zinc, cadmium, mercury, cerium, europium, thorium, uranium or a mixture of two or more thereof, more preferably sodium, potassium, calcium, magnesium, beryllium, boron, aluminum, gallium, indium, germanium, tin, lead, bismuth, titanium, zirconium, hafnium, vanadium, niobium, tantalum, chromium, molybdenum, tungsten, manganese, rhenium, iron, cobalt, nickel, ruthenium, copper, zinc, cadmium, mercury, cerium or a mixture of two or more thereof.

The elements recited above may be employed especially in the form of their sulfates, phosphates, nitrates, carbonates, halides and perchlorates and also in the form of easily hydrolyzable organometallic compounds such as alcoholates, chelates, carboxylates, preferably in the form of sulfates, phosphates and nitrates, more preferably in the form of sulfates and nitrates.

They can also be employed in the form of isopoly cations or heteropoly cations as described in references DE-A 44 07 326 and DE-A 195 43 638 which were mentioned at the beginning and the relevant contents of which are likewise fully incorporated herein by reference.

In a further embodiment of the present invention, the mixture of silica precursor, template and liquid medium may be applied to an inert porous support, for example a porous glass, an alumina, diatomaceous earth or clay, a ceramic material, a metal, a metal packing or a metal mesh as used for static mixers or reactive distillation column packings, for example. This makes it possible to produce inert supports covered or impregnated with silica solid by the process of the invention to provide composite materials which have improved mechanical stability and improved permeability in the catalytic reactor compared to the starting materials.

In this context, metallic support materials, for example the stainless steels having the material numbers 1.4767, 1.4401, 2.4610, 1.4765, 1.4847, 1.4301, etc., are particulary useful since their surface can be roughened by heat treatment before they are covered/impregnated with the solids. Particular preference is given to using Kanthal (material number 1.4767) or aluminum-containing metals as mesh material. Kanthal is an alloy containing about 75% by weight of Fe, about 20% by weight of Cr and about 5% by weight of Al. Heat treatment is effected by heating the metallic supports cited above in air at from 600 to 1100° C., preferably from 800 to 1000° C., for from one to twenty hours, preferably from one to ten hours, and cooling back down. This pretreatment is described in EP-A-0 564 830 and is important since the heat treatment significantly improves the bonding between the solids and the metallic supports.

If contacting is effected at a stationary interface, ie. at the interface of two immiscible fluids, the silica solid may be obtained in the form of thin films or layers since the presence of such an interface makes it possible to provide the solid, during its preparation, with a particular oriented structure such as a thin film. Further details are described in DE-A 196 24 862. Thin films or layers obtained in this manner may be employed in to membrane, separation or purification processes or may be used for information storage. Such applications are described, for example, in DE-A 44 24 221, the relevant contents of which are fully incorporated herein by reference.

Such solids may be utilized in particular for electronic, optical or electrooptic applications; corresponding membranes are utilized in the catalytic conversion in membrane reactors or in reactive distillations. The present invention accordingly also provides for the use of a solid of the invention as catalyst or catalyst support, as matrix for active components, in membrane, separation or purification processes, for producing electrical, optical or electro-optic components such as switching devices or sensors, for producing oxide ceramics or for separating substances, as adsorbent, as filler, especially in polymers, as fire retardant and as abrasives and polishing materials.

If the solid of the invention is used as adsorbent, it may be utilized in fixed-bed, moving-bed and fluidized-bed processes, the solid always being contacted with the starting material to be treated.

Specific examples are the following processes:

Separation of hydrocarbons having a different number of C atoms and separation of different hydrocarbon isomers (separation of n-isomer and iso isomer, for example); removal of hydrogen from hydrogen-comprising gases, such as $H_2$ from reformer gas, refinery gas or $NH_3$ synthesis gas, air fractionation ($N_2/O_2$ separation); ozone enrichment, for example by the Sorbozone process or the Linde ozone process; removal of methane from methane-comprising gas mixtures such as mine gas, desulfurization of Claus process effluent gases, flue gases or effluent gases of chemical and metallurgical processes, simultaneous removal of sulfur dioxide and nitrogen oxides and processes for drying gases by adsorption.

Further adsorption processes in which the solid of the invention may be utilized, and details of the abovementioned processes are described in the literature according to W. Kast, Adsorption aus der Gasphase, VCH-Verlag 1988, in particular p. 213–273, which is incorporated herein by reference, and the references cited therein.

If the solid of the invention is used as catalyst or catalyst support, it is particularly useful in hydrocarbon oxyfunctionalization, olefin oxidation to give oxiranes, aromatics alkylation, hydrogenation, dehydrogenation, hydration, dehydration, isomerization, an addition reaction, an elimination reaction, nucleophilic or electrophilic substitution, dehydrocyclization, hydroxylation of heteroatoms, aromatics hydroxylation, epoxy-aldehyde rearrangement, amination of monomeric or oligomeric olefins, an aldol type condensation reaction, a polymerization reaction, esterification or etherification, the catalytic conversion of exhaust gases and flue gases and for nitrogen oxide removal, the educt to be converted in each case being contacted with the silica solid in the gas phase or liquid phase in a suspension, fluidized-bed or fixed-bed process.

The solid of the invention is in particular characterized by the following properties:

In X-ray analysis, it has strong reflections in the angular range from 2 to 4° (2θ) when measured using Cu $K_\alpha$ radiation.

The solid has micropores, in particular pores in the range from less than 2 nm and more than 5 nm, preferably less than 2 and more than 10 nm, more preferably less than about 2 and more than 20 nm, the pore diameter being determined by nitrogen adsorption at 77 K. The specific surface area determined under the same conditions by the method of Langmuir is more than about 500 m²/g, preferably more than about 600 m²/g, especially from about 700 to 1500 m²/g.

The pore volume, likewise determined by nitrogen adsorption at 77 K, is more than about 0.15 ml/g, preferably more than about 0.5 ml/g, especially from about 0.5 ml/g to 1.0 ml/g.

The present invention further provides the use of a polyethyleneimine or a mixture of two or more thereof as template in the preparation of a silica solid.

The Examples which follow more particularly describe the preparation and the properties of the solid according to the invention and according to a prior art method, ie. without adding a polyethyleneimine.

EXAMPLES

Inventive Example 1

A solution of 209 g of tetraethyl orthosilicate, 150 g of ethanol and 61.0 g of isopropanol was homogenized in a 2 l four-neck flask for 30 minutes. A solution of 50.0 g of polyethyleneimine (Polymin wasserklar, BASF) in 150 g of ethanol was then added to this mixture. Upon addition of a solution of 650.0 g of deionized water and 7.5 g of hydrochloric acid solution (10% by weight) a suspension was formed. The suspension was stirred at room temperature for 24 h and then filtered. The solid was then dried at 120° C. overnight. 111.4 g of solid were obtained. The solid was finally calcined in air at 500° C. for 5 hours. The loss on calcination was 47% by weight, based on the solid used.

Nitrogen adsorption at 77 K gave a typical hysteresis in the relative pressure range p/p°>0.98 as shown in FIGURE 2. The surface area as calculated by the method of Langmuir was 764 m²/g. The corresponding micropore volume was 0.20 ml/g. Using the model of Barret, Joyner and Halenda (cf. J. Am. Chem. Soc. 73 (1951), 373–380), pores in the range from 10 to 100 nm having a mean diameter of 20 nm and a total pore volume of 0.82 ml/g was calculated from the hysteresis.

X-ray analysis of the solid obtained in this manner gave an amorphous halo in the range of 15 to 35° (2θ) and a broad peak at about 2.70 (2θ) (Cu $K_\alpha$ radiation), corresponding to a d value of about 2.7 nm.

Comparative Example 1

A solution of 209 g of tetraethyl orthosilicate, 300 g of ethanol and 61.0 g of isopropanol was homogenized in a 2 l four-neck flask for 30 minutes. Upon addition of a solution of 650.0 g of water and 7.5 g of the hydrochloric acid solution (10% by weight) a suspension was formed. The suspension was stirred at room temperature for 24 h and then filtered. The resulting solid was then air dried at 120° C. overnight. 31 g of solid were obtained. The solid was then calcined at 500° C. for 5 hours. The loss on calcination was 12% by weight.

Nitrogen adsorption at 77 K gave a Langmuir surface area of 30 m²/g after a long measuring time. The corresponding pore volume was only 0.013 ml/g as determined at a relative pressure p/p° of 0.98.

We claim:

1. A process for preparing a silica solid, which comprises the step of contacting in a liquid medium at a temperature from about −10 to about 150° C. at least one silica precursor with at least one template comprising a polyethyleneimine having molecular weights in the range from about 450 to 100,000 g/mol or a mixture of two or more thereof.

2. A process as defined in claim 1, wherein the template is a polyethyleneimine or a mixture of two or more thereof or a polymer dispersion comprising a polyethyleneimine or a mixture of two or more thereof.

3. A process as defined in claim 1, wherein the non-crystalline silica solid comprises at least one element selected from the group consisting of sodium, potassium, calcium, magnesium, beryllium, boron, aluminum, gallium, indium, germanium, tin, lead, bismuth, titanium, zirconium, hafnium, vanadium, niobium, tantalum, chromium, molybdenum, tungsten, manganese, rhenium, iron, cobalt, nickel, ruthenium, copper, zinc, cadmium, mercury and cerium.

4. A process as defined in claim 1, wherein the precursor is additionally contacted with a pharmacologically active organic or inorganic compound, an enzyme, a pigment or a mixture of two or more thereof.

5. A process as defined in claim 1, wherein the contacting is carried out in the presence of an insert porous support or at a stationary interface.

6. A non-crystalline silica solid obtained by the process of claim 1.

7. A process of removing hydrogen from gas mixtures, characterized in that the gas mixture is brought into contact with a non-crystalline silica solid obtained by a process according to claim 1.

8. A process of removing methane from gas mixtures, characterized in that the gas mixture is brought into contact with a non-crystalline silica solid obtained by a process according to claim 1.

9. A process of hydrocarbon separation characterized in that the hydrocarbons to be separated are brought into contact with a non-crystalline silica solid obtained by a process according to claim 1.

10. A process of disulfurization of gases, characterized in that the gas to be disulfurized is brought into contact with a non-crystalline silica solid obtained by a process according to claim 1.

11. A process of simultaneously removing sulfur dioxide and nitrogen oxides from a gas, characterized in that the gas is brought into contact with a non-crystalline silica solid obtained by a process according to claim 1.

12. A process of catalytically oxidizing an olefin, characterized in that the olefin and the oxidizing agent are brought into contact with a non-crystalline silica solid obtained by a process according to claim 1.

* * * * *